US008943570B1

(12) United States Patent
Kalbag (10) Patent No.: US 8,943,570 B1
(45) Date of Patent: Jan. 27, 2015

(54) TECHNIQUES FOR PROVIDING ENHANCED NETWORK SECURITY (75) Inventor: Rohit Kalbag, Bridgewater, NJ (US)

(73) Assignee: Cellco Partnership, Basking Ridge, NJ (US)

( * ) Notice: Subject to any disclaimer, the term of this patent is extended or adjusted under 35 U.S.C. 154(b) by 498 days.

(21) Appl. No.: 12/958,907

(22) Filed: Dec. 2, 2010

(51) Int. Cl.
H04L 29/06 (2006.01)
G06F 21/00 (2013.01)

(52) U.S. Cl.
CPC .......... *H04L 63/0815* (2013.01); *H04L 63/083* (2013.01); *H04L 63/0272* (2013.01); *H04L 63/166* (2013.01)
USPC .................. 726/8; 726/12; 713/183; 709/225

(58) Field of Classification Search
CPC ... H04L 63/08; H04L 63/0815; H04L 63/083; H04L 63/166; H04L 63/02; H04L 63/0272; H04L 12/4641
USPC ............ 726/3–5, 8, 12, 14, 15; 713/182, 183; 709/225, 229
See application file for complete search history.

(56) References Cited

U.S. PATENT DOCUMENTS

| 6,081,900 | A * | 6/2000 | Subramaniam et al. ........ 726/19 |
| 6,430,542 | B1 * | 8/2002 | Moran ........................ 705/36 R |
| 6,615,264 | B1 * | 9/2003 | Stoltz et al. .................... 709/227 |
| 7,042,988 | B2 * | 5/2006 | Juitt et al. ................... 379/88.17 |
| 7,146,639 | B2 * | 12/2006 | Bartal et al. ..................... 726/11 |
| 7,251,692 | B1 * | 7/2007 | Raz ................................. 709/225 |
| 7,363,349 | B2 * | 4/2008 | Friedman et al. ............. 709/217 |
| 7,428,590 | B2 * | 9/2008 | Miller et al. ................... 709/225 |
| 7,844,729 | B1 * | 11/2010 | Friedman et al. ............. 709/238 |
| 8,131,847 | B2 * | 3/2012 | Kalbag ........................... 709/224 |
| 8,296,428 | B2 * | 10/2012 | Kalbag ........................... 709/224 |
| 2003/0037237 | A1 * | 2/2003 | Abgrall et al. ................. 713/166 |
| 2005/0157722 | A1 * | 7/2005 | Yoshimoto et al. ........... 370/392 |
| 2011/0161506 | A1 * | 6/2011 | Dickerson ..................... 709/228 |

* cited by examiner

Primary Examiner — Zachary A Davis (57) ABSTRACT

Exemplary network infrastructures and methods employing a Security Gateway utilize client authentication for use of a secure connection between an application client and an application server of a protected network. Once a secure connection has been set up, a Security Gateway can start a timer for establishing a period within which a password and username are to be received from the application client before traffic is allowed to exit the Security Gateway. If a username and password are provided while the timer is running, the Security Gateway can contact a single sign on (SSO) server to check whether the username and password are correct. If the username and password are valid, the Security Gateway can start relaying traffic externally to the application server. If an invalid username and password are provided or the timer times out before receipt of a username and password, the secure connection can be terminated.

20 Claims, 5 Drawing Sheets

TECHNIQUES FOR PROVIDING ENHANCED NETWORK SECURITY

BACKGROUND

Use of the Internet has become commonplace and an everyday occurrence to significant portions of the World's population. Such use of the Internet often includes secured access, utilizing security features, for example Secure Socket Layer (SSL) or Hypertext Transfer Protocol Secured (HTTPS) connections. Mobile stations have developed so as to also afford users the ability to access the Internet. In addition, the communications that such devices offer, via wireless mobile communications network, enable users to talk and exchange various types of messages for business and personal reasons and to access information, all from or while traveling through any location where a network provides service.

SSL is a protocol that uses a cryptographic system employing two keys to encrypt data: a public key known to everyone and a private or secret key known only to the recipient of the message. Transport Layer Security (TLS) protocol is a successor to SSL. Hypertext Transfer Protocol Secure (HTTPS) is a combination of the Hypertext Transfer Protocol with the SSL/TLS protocol to provide encrypted communication and secure identification of a network web server. HTTPS connections are often used for payment transactions on the World Wide Web and for sensitive transactions in corporate information systems.

A virtual private network (VPN) supplies network connectivity over a possibly long physical distance. VPN technologies include various security mechanisms to protect the virtual, private connections. In this respect, a VPN is a form of Wide Area Network (WAN). VPNs enable file sharing, video conferencing and similar network services. A key feature of a VPN is its ability to work over private networks as well as public networks like the Internet. Using a method called tunneling, a VPN can use the same hardware infrastructure as existing Internet or intranet links.

Normally SSL connections or HTTPS connections just authenticate the identity of the server the client is establishing a session to. For example, when a web browser tries to securely connect to a bank's server, the browser checks that the certificate provided by the server is authentic and certifies that the web server belongs to the bank. SSL also provides a means to authenticate the client by certificates or pre-shared keys but those means are rarely used. Client-side authentication is only used when the server wants to give access to only authentic clients, for example, through a network-side SSL gateway.

Authenticating the client means that one has to undertake the task of distributing certificates to all devices over a secure out-of-channel means to distribute keys to all these devices. In addition, as the client-side authentication is rarely used, new devices like Smartphones and new operating systems like Android do not have built-in support for client-side certificate management and operations.

Network security equipment enables end-customers' devices to establish secure connections to the network, for example, through VPN or SSL gateways. While setting up these secure connections mutual authentication is required. Mutual authentication implies that the customer device authenticates that it is talking to the true and valid operator's network and the network authenticates that it is establishing a secure tunnel with a true and valid end-device, e.g., a mobile station with authentic client applications. Authenticating a network is typically straight forward as the network element can have a public certificate that generates trust. Authenticating devices on the other hand is more complicated as it involves distributing unique keys or certificates to multiple devices.

SUMMARY

The teachings herein provide improved methods, network infrastructures, and equipment (e.g., network elements such as server computers and/or programming for the network elements) to provide techniques and mechanisms for enhanced network security, in which a Security Gateway relies on an application-related authentication to authenticate a client application before allowing free flow of traffic to a protected network during a secure session. This approach, for example, facilitates client side authentication by leveraging application authentication after the setup of a secure session.

For example, in one aspect the detailed description and drawings disclose a network infrastructure for providing access to a protected network with enhanced security. The infrastructure may include a Domain Name System (DNS) server configured to respond to a DNS request for an application server in the protected network from an application client with an IP address of a Security Gateway connected to the protected network. The infrastructure may include a Single Sign On (SSO) server within the protected network. The SSO server is configured to receive a username and a password, and as an authentication check, check the username and password against a list of valid usernames and passwords for the client to access that particular application. The SSO server produces an authentication check result for the username and password, e.g., indicating whether or not the username and password are valid. A Security Gateway can be included that is configured to provide an interface between the protected network and one or more application clients, e.g., application clients resident on one or more mobile stations. The Security Gateway may further be configured to: (a) provide access for the application client to the Security Gateway for a limited time for authentication of the application client; (b) receive a user name and password from the application client; (c) in response, provide the username and password to the SSO server in the protected network for an authentication check; and (d) provide appropriate access between the client application and the application server, as a result of the authentication check result.

Another aspect of the detailed description and drawings relates to a method of providing an application client access to a protected network with enhanced security. Upon receipt of a request for an application server IP address from an application client, a DNS server provides a DNS response with an IP address of a Security Gateway. The Security Gateway is configured to provide an interface between the protected network and one or more application clients, e.g., application clients that are resident on one or more mobile stations. The method may also involve providing access for the application client to the Security Gateway for a limited time for authentication of the application client. A username and password are received from the application client at the Security Gateway; and the username and password are provided from the Security Gateway to a Single Sign On (SSO) server in the protected network for authentication of the client application. The SSO server performs an authentication check on the username and password, and produces an authentication check result, e.g., indicating whether or not the username and password are valid. The method may also involve providing appropriate access between the client application and the application server, in response to the authentication check result.

Additional advantages and novel features will be set forth in part in the description which follows, and in part will become apparent to those skilled in the art upon examination of the following and the accompanying drawings or may be learned by production or operation of the examples. The advantages of the present teachings may be realized and attained by practice or use of various aspects of the methodologies, instrumentalities and combinations set forth in the detailed examples discussed below.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

Functionality, systems, and methods for facilitating security enhancement for the establishment of secured connections such as virtual private networks and client side authentication are shown and described.

In general terms, examples of the present disclosure can facilitate client side authentication by leveraging application authentication after the setup of a secure session based on server authentication and/or use of a pre-shared key. A Security Gateway can require client authentication for use of a secure connection between an application client and an application server located in an operator's private or protected network. Once a secure connection has been setup, the Security Gateway can start a timer for establishing a period within which one or more further conditions are to be met before traffic from the application client is allowed to exit the Security Gateway for communication with the application server. The Security Gateway can be enhanced by the addition of an HTTP processing agent, e.g., a web server or the like. While the timer is running, the Security Gateway can anticipate an HTTPS connection, e.g., a post, including application authentication such as a username and password, which can be used to authenticate the application client. If such a connection does not come before the timer expires, the Security Gateway can terminate the secure connection. Further action can then be taken, such as black-listing that particular client. If an HTTP connection with a username and password is provided while the timer is running, the SSL gateway can contact a single-sign-on (SSO) server to check whether the username-password combination is correct. If the username and password are valid, the Security Gateway can start relaying traffic, e.g., IP packets, externally to the application server in the protected network. If an invalid username and password are provided, the secure connection can be terminated. An advantage of such a scheme is that by combining the capabilities of a server certificate based connection and application-level username-password authentication, the Security Gateway can create a mutually authenticated secure connection in an efficient manner.

For example, a company may desire to deploy such a Security Gateway for establishing a SSL link for secure access to its corporate network so that all corporate application servers like HR, payroll, etc., would be available via access to the corporate network of the company. The company would want to ensure that this access is available only to authentic employees. One way to do that using an example of the present disclosure would be that after the employee's computer establishes a SSL session, the employee's computer would send the employee's email ID and password within, e.g., one second, via HTTPS to the SSL Security Gateway. The Security Gateway could verify the email credentials from the email server or another database and then keep the SSL connection open on success, or close it on failure.

Reference now is made in detail to the examples illustrated in the accompanying drawings and discussed below.

Figure 1:
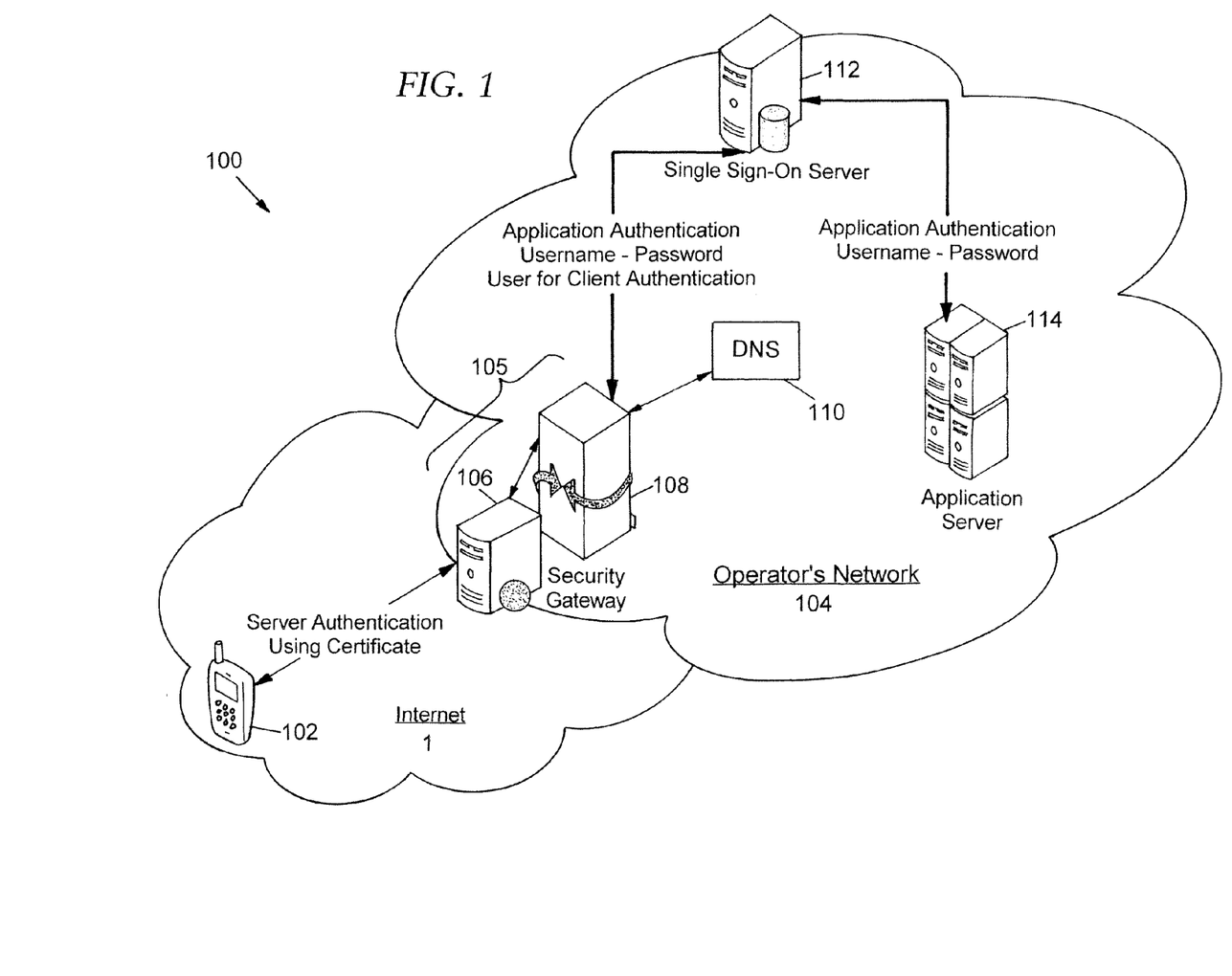
FIG. 1 is a functional block diagram that depicts various components of an exemplary mobile communications network as used for establishing a virtual private network connection to a protected network with enhanced security provisions.

An example of a network 100 with enhanced network security functionality is shown FIG. 1. Network 100 includes one or more application clients 102, e.g., resident on a mobile station (one is shown for simplicity) configured for operation with an operator's protected network. The mobile device or station can be an advanced device, e.g., a Blackberry/RIM, Android, Palm, LiMo, Java, or Linux device, or the like. While application client 102 is indicated as being resident on a mobile station, application clients may of course be resident in stationary functionality such as personal computers and the like. The operator's network 104 can include a DNS database or server 110, a single-sign on (SSO) server 112 and also one or more application servers 114 (one is shown). The user of the application client can utilize the Internet 1 to access the operator's network 104 by way of a Security Gateway 105. The Security Gateway 105 can have an Internet Side 106 and a Protected Side 108 for establishing a secure connection, e.g., SSL connection or virtual private network (VPN) connection, allowing the application client on the mobile station 102 to securely access elements, e.g., application server 114, in the operator's protected network 104.

Figure 2:
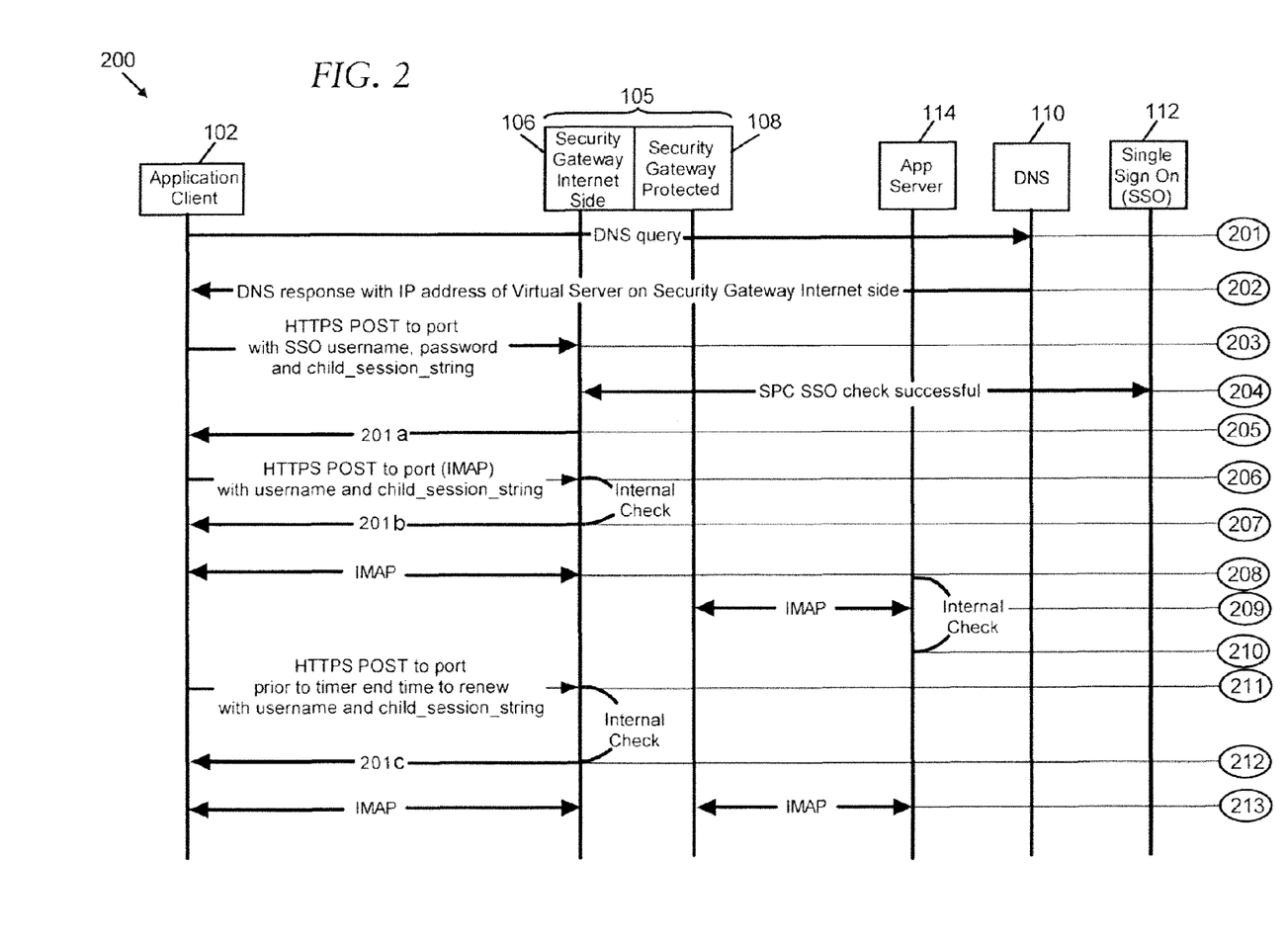
FIG. 2 is a flowchart showing various aspects of a call flow for establishing a secure connection to a private network with enhanced security provisions.

FIG. 2 depicts an example of a call flow 200 for an example of a Security Gateway and a protocol that applications can use to access an operator's private network through a secure connection. The protocol can be used by one or more application clients desiring to directly connect to the respective application server(s) without the use of VPNs and without using SSL (e.g., because their application protocol cannot make use of SSL for example email protocols like IMAP and POP). As shown in FIG. 2, reference is provided to network elements of network 100 of FIG. 1.

In FIG. 2, call flow 200 includes an application client, such as operating on a user's mobile station 102, sending a DNS query to a DNS server 110, e.g., used with an email application, in the mobile station operator's network 104, as described at 201. The Security Gateway 105 includes an Internet side 106 and a secured or protected side 108 for accessing the operator's network. In exemplary embodiments, the Security Gateway can include or be implemented as a virtual server including IP addresses and ports that correspond to the application server 114 in the operator's network 104. The ports can include one or more ports (e.g., parent ports) that are contacted by an application client, e.g., on mobile station 102, for purposes of authentication. One or more additional ports (e.g., child ports) can be used for traffic between the application client 102 and the application server 114, once authentication has occurred. The DNS server 110 can respond with an IP address of the virtual server on the Internet side 106 of the Security Gateway, as described at 202, e.g., for establishing a SSL or VPN connection. The application client 102 can then make a HTTPS post to the virtual server 106, as described at 203.

For enhanced security, the HTTPS post can include an application username and password previously used on the mobile station to authenticate the mobile station user for client side authentication. Such a username and password may be referred to as a SSO username and password. In addition, a child session string, e.g., a 24 character string, may be included in the body of the HTTP post. The virtual server on the Internet side 106 of the Security Gateway can provide the SSO username and password to the SSO Server 112 for authentication, as described at 204. The SSO server can perform an authentication check of the SSO username and password, and produce an authentication check result, e.g., indicating whether the SSO username and password are valid or not. In the event that the SSO check indicates that the SSO username and password are valid, the virtual server can send a corresponding reply, e.g., a 201a message, to the application client 102, as described at 205.

Continuing with the description of call flow 200, application traffic data (packets) can flow to and from the client application on mobile station 102, once use of the Security Gateway 105 has been authenticated. The application client 102 can provide a HTTP post to the virtual server (e.g., representing the email server prior to sending IMAP) 106, including username and child session string, as part of an internal check, as described at 206 and 207. The Security Gateway 105 does not pass this HTTP post to the email server but uses this information to do an internal check and correlate that this IMAP session is being originated by the same client that was successfully authenticated earlier and can provide a response, e.g., a 201b message, to the application client 102, as described at 207. The Security Gateway 105 can then allow the incoming IMAP traffic from the client to pass through to the server 114, as shown in 208 and 209. To continue the authenticated transfer of IMAP traffic through the Security Gateway 105, the client preferably periodically provides HTTP posts to the virtual server (representing the email server), with the username and child session string to renew the session, as described at 211-212. The time period for such renewal HTTP posts can be selected as desired, e.g., every 15 minutes. These HTTP POSTs will be consumed by the Security Gateway 105 and are not required to be forwarded to the email server 114, though a response, e.g., a 201c message, can be provided by the Security Gateway to the application client 102, as described at 212.

Figure 3:
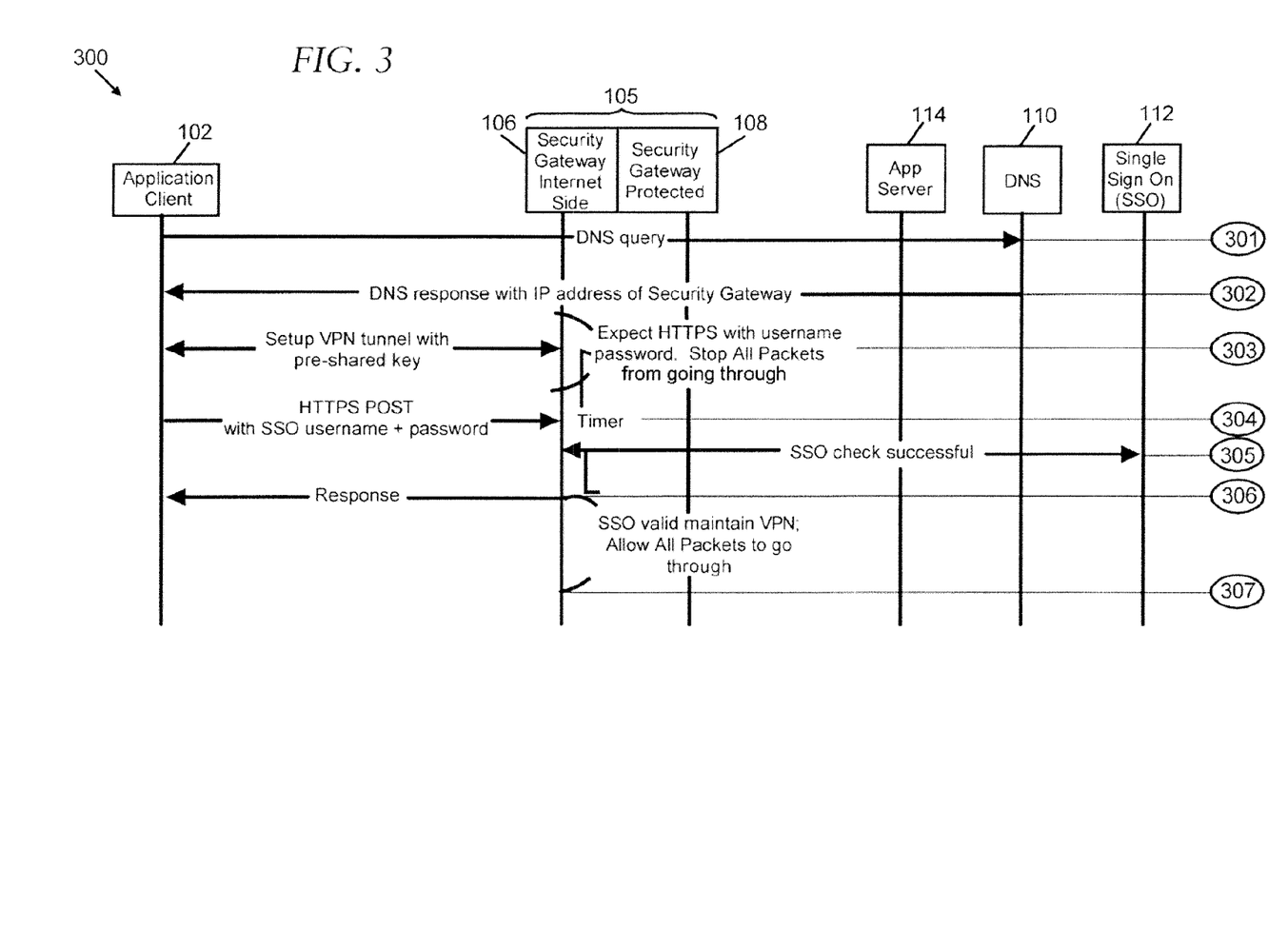
FIG. 3 is a flowchart showing further various aspects of a call flow for establishing a virtual private network with enhanced security provisions.

FIG. 3 depicts a call flow 300 for setting up a VPN connection utilizing a Security Gateway and a global pre-shared key. As shown in FIG. 3, reference is provided to network elements of network 100 of FIG. 1. FIG. 3 also depicts using a SSO login to keep the VPN up and running.

For call flow 300 in FIG. 3, a DNS query from an application client 102, e.g., implemented on a mobile station, is received by a DNS server 110 in an operator's network, as described at 301. In response, the DNS server 110 provides a response with an IP address of the Security Gateway, e.g., the Internet Side 106, as described at 302. The application client 102 may possess a pre-shared security key, such as one supplied by the network operator of the network. A VPN tunnel may be established in response to the application client 102 providing the pre-shared key to the Internet side of the Security Gateway 106, as further described at 303. Upon establishing the VPN tunnel, a timer can be started, specifying a time within which a HTTPS post, including a SSO username and password, from the application client are expected, as described at 304. During this time, all packets can be prevented from passing through the Security Gateway 105 to the application server 114. The application client 102 may make a HTTPS post with a previously used username and password as a SSO username and password to the Security Gateway 105, as further described at 304. The Security Gateway 105 can provide the SSO username and password to a SSO server 112 in the network for authentication of the application client 102, as described at 305. The SSO server can perform an authentication check of the SSO username and password, and produce an authentication check result, e.g., indicating whether the SSO username and password are valid or not. In response to an authentication that the SSO username and password are valid, a response may be sent from the Security Gateway to the application client 102, e.g., indicating that the SSO username and password have been authenticated, as described at 306. At this point, traffic (indicated by "All Packets") may be permitted to go through the VPN to and from the application server 114, as described at 307.

Figure 4:
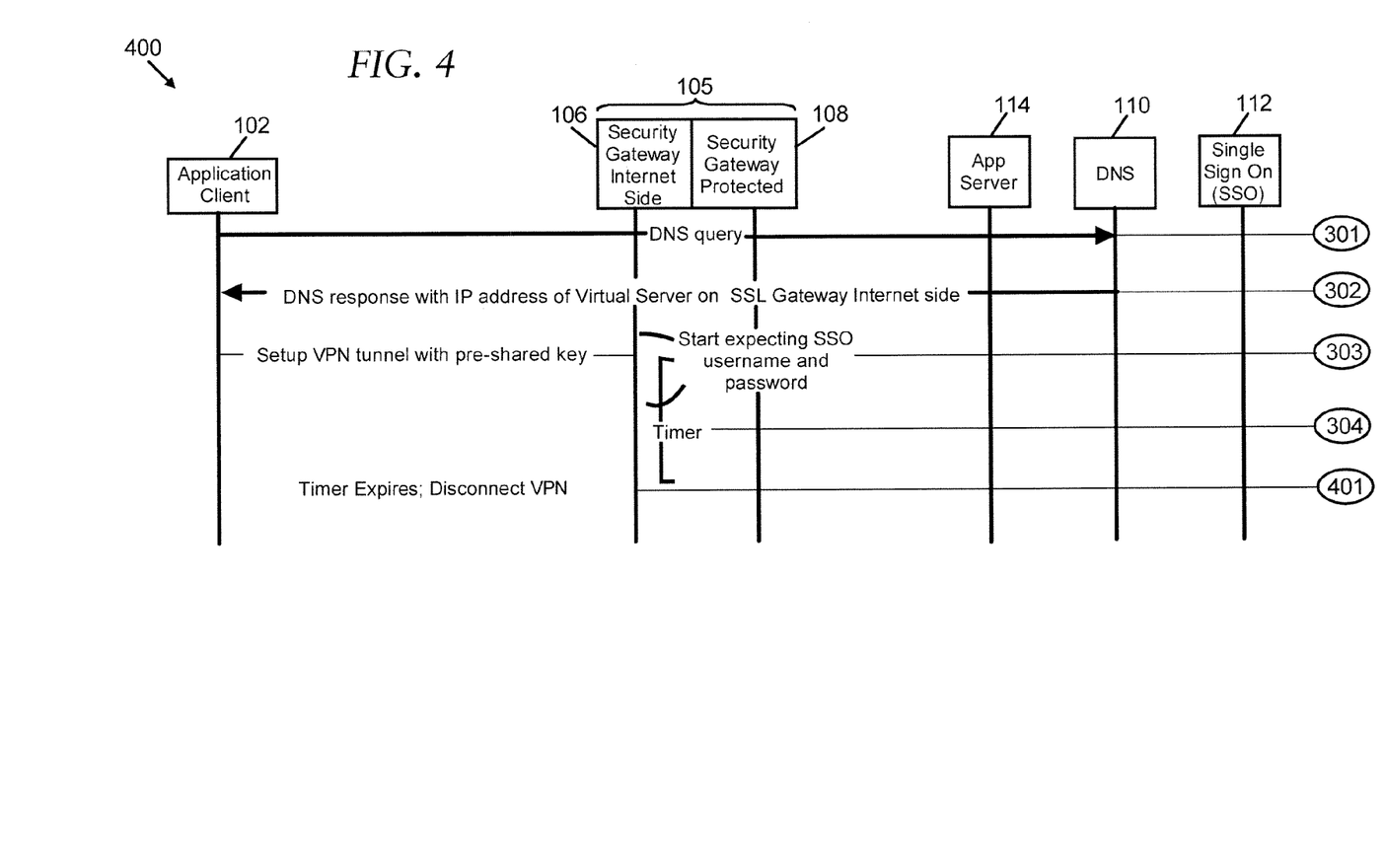
FIG. 4 is a flowchart showing various further aspects of a call flow for enhancing security provisions for the establishment of a virtual private network.

FIG. 4 depicts a call flow 400 similar to that of FIG. 3 but with the timer expiring before a valid username and password have been submitted. The network elements and steps are similar to those of FIG. 3, except disconnection of the VPN after the timer has expired, is described at 401.

Figure 5:
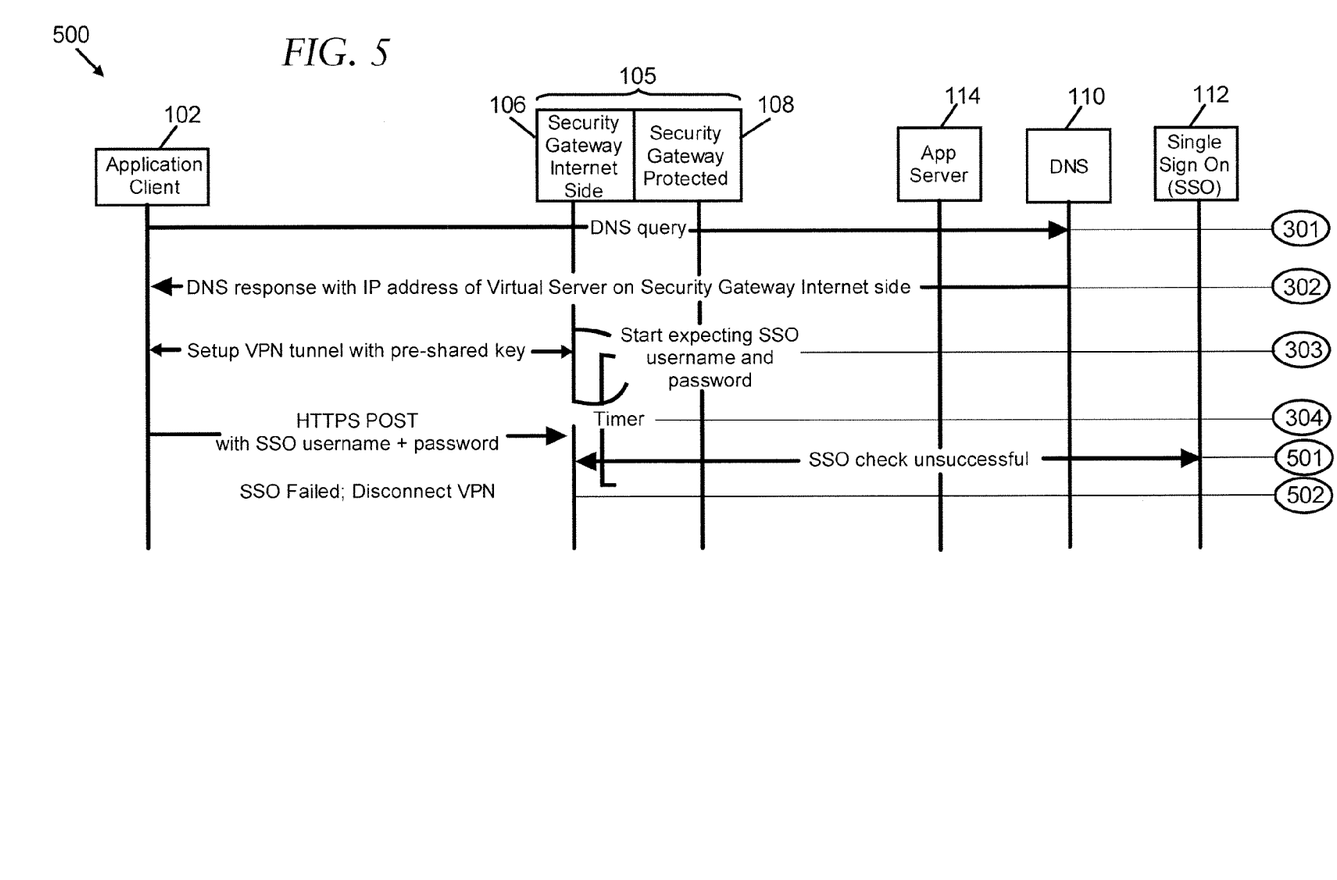
FIG. 5 is a flowchart showing various further aspects of a call flow for enhancing security provisions for the establishment of a virtual private network.

FIG. 5 depicts a call flow 500 similar to that of FIG. 3 but with an invalid username and password being received from the application client. The network elements and steps are similar to those of FIG. 3, except the SSO authentication indicates an invalid SSO username and password have been supplied by the application client, as described at 501. As a result, the VPN is disconnected, as described at 502.

As described above, network infrastructures and methods include use of a Security Gateway to facilitate enhancement of network security. Such Security Gateways can be implemented in different configurations. For example, instances of a Security Gateway can be implemented as a single-homed, single port Security Gateway configured with one virtual IP address and one port. A Security Gateway can be implemented as a single-homed, multiple port Security Gateway configured with one virtual IP address and multiple ports. Instances of a Security Gateway can be implemented as a multiple-homed, single port Security Gateway configured with multiple virtual IP addresses and one port. Further, a Security Gateway can be implemented as a multiple-homed, multiple port Security Gateway configured with multiple virtual IP addresses and multiple ports.

As shown by the above discussion, functions relating to enhancing network security may be implemented on one or more programmable network elements such as server computers configured for implementing a secure or protected infrastructure or platform utilizing and/or implementing a Security Gateway as shown by way of example in FIGS. 1-2. The software functionalities involve programming, including executable code as well as associated stored data, e.g., files used for code recognition. The programming code is executable by the processor (microprocessor or the like) that functions as the control element of the particular network element, e.g., server computer. In operation, the code is stored within the memory of the network element for loading and execution by the processor. At other times, however, the executable code may be stored at other locations and/or transported for loading into the network element. Execution of such code by the processor of the network element enables the network element to implement methodology for facilitating enhanced network security, in essentially the manner performed in the examples discussed and illustrated herein.

Hence, aspects of the methods of providing enhanced network security outlined above may be embodied in programming. Program aspects of the technology may be thought of as "products" or "articles of manufacture" typically in the form of executable code and/or associated data that is carried on or embodied in a type of machine readable medium. "Storage" type media include any or all of the non-transitory, tangible memory of the computers, processors, mobile stations or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from a computer or processor into a network element, e.g., server computer, to add or update the functionality to that device. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, "storage" media relates to tangible, non-transitory media for storing programming and/or data, and unless restricted to such "storage" media, terms such as computer or machine "readable medium" refer to any medium that participates in providing instructions to a processor for execution.

Such a machine readable medium may take many forms, including but not limited to, a tangible storage medium, a carrier wave medium or physical transmission medium. Non-volatile storage media include, for example, optical or magnetic disks, such as any of the storage devices in the network elements illustrated in the drawings. Volatile storage media include dynamic memory, such as main memory of such a computer platform. Tangible transmission media include coaxial cables, copper wire and fiber optics, including the wires that comprise a bus within a computer system. Carrier-wave transmission media can take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a ROM, a PROM and EPROM, a Flash-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

APPENDIX

Acronym List

The description above has used a large number of acronyms to refer to various services, messages and system components. Although generally known, use of several of these acronyms is not strictly standardized in the art. For the convenience of the reader, the following list correlates terms to acronyms, as used in the detailed description above.

3GPP2: 3rd generation partnership project 2
AAA: authentication-authorization-accounting
ADS: application download server
AGPS: assisted global positioning system
API: application programming interface
BREW: binary runtime environment for wireless
BS: base station
BTS: base transceiver system
CDMA: code division multiple access
CD-ROM: compact disc read-only memory
CLNR: certified like-new replacement
DNDA: do not disturb application
DVD: digital video disc
DVD-ROM: digital versatile (video) disc read-only memory
EPROM: erasable programmable read-only memory
EV-DO: evolution-data optimized
ESN: electronic serial number
GPM: group provisioning manager
GPMD: group provisioning manager device
GPS: Global Positioning System
GSM: global system for mobile communications
GW: gateway
HA: home agent
HLR: home location register
IMAP: Internet message access protocol
IP: Internet protocol
IR: infrared
LBS: location based services
LBSI: location based services infrastructure
LCD: liquid crystal display
LDAP: lightweight directory access protocol
LTE: long-term evolution
MC: message center
MDN: mobile directory number
MIN: mobile identification number
MPC: mobile positioning center
MS: mobile station
MSC: mobile switching center
MT: mobile traffic
PC: personal computer
PDE: position determining entity
PN: pseudo-random noise
PROM: programmable read-only memory
PSDN: packet data serving node PSTN: public switched telephone network
RAM: random access memory
RAN: radio access network
RF: radio frequency
SCM: service creation manager
SCMD: service creation manager device
SIF: standard interchange format
SMPP: short message peer-to-peer
SMS: short messaging service
SS7: signaling system 7
STP: signaling transfer points
TCP: transmission control protocol
TDMA: time-division multiple access
UMTS: universal mobile telecommunications system
USB: universal serial bus
VLR: visitor location register
WAN: wide are network
WASP: WiFi application secure proxy
XCVR: transceiver
ZPD: zone provisioning device

What is claimed is:

1. A network infrastructure for providing access to a protected network with enhanced security, the infrastructure comprising:
- a Security Gateway connected to the protected network, the Security Gateway configured to provide an interface between the protected network and an application client residing outside the protected network;
- a Domain Name System (DNS) server within the protected network, the DNS server configured to provide a DNS response, to a DNS request for an application server's Internet Protocol (IP) address from the application client, with an IP address of the Security Gateway, the application server residing inside the protected network; and
- a Single Sign On (SSO) server within the protected network, the SSO server configured to (i) receive a username and a password, and (ii) as an authentication check, check the username and password against a list of valid usernames and passwords for the application server in the protected network;

wherein the Security Gateway is further configured to:
- (a) establish a secure connection between the protected network and the application client via a predetermined secure protocol, responsive to the DNS response;
- (b) provide the application client access to the Security Gateway via the established secure connection for a limited time for authentication of the application client, while restricting access to the protected network;
- (c) receive the username and the password from the application client, the username and the password associated with the application client;
- (d) in response, provide the username and password to the SSO server in the protected network for the authentication check of the application client;
- (e) provide access between the application client and the application server via the established secure connection, in response to the authentication check verifying that the username and password associated with the application client are valid; and
- (f) require, from the application client, further instances of the username and password for continued traffic between the application client and the application server.

2. The network infrastructure of claim 1, wherein the Security Gateway is further configured in (a) to set up a secure socket layer (SSL) connection between the application client and the Security Gateway.

3. The network infrastructure of claim 1, wherein the Security Gateway is further configured in (a) to set up a virtual private network (VPN) connection between the application client and the Security Gateway.

4. The network infrastructure of claim 1, wherein the Security Gateway is further configured to implement a timer for establishing a desired time within which to receive the username and the password from the application client.

5. The network infrastructure of claim 4, wherein the Security Gateway is further configured in (b) to terminate access of the application client to the Security Gateway when the application client fails to provide the username and the password to the Security Gateway within the desired time.

6. The network infrastructure of claim 1, wherein the Security Gateway is further configured in (e) to terminate the access of the application client to the Security Gateway when the authentication check produced by the SSO server indicates an invalid username and password.

7. The network infrastructure of claim 1, wherein the Security Gateway is further configured in (b) to provide the access for the application client to the Security Gateway for authentication of the application client in response to receiving a pre-shared key from the application client.

8. The network infrastructure of claim 1, wherein an Internet side of the Security Gateway, used by the application client for accessing the Security Gateway from outside of the protected network, comprises a single-homed, single port Security Gateway configured with one virtual Internet Protocol (IP) address and one port.

9. The network infrastructure of claim 1, wherein an Internet side of the Security Gateway, used by the application client for accessing the Security Gateway from outside of the protected network, comprises a single-homed, multiple port Security Gateway configured with one virtual Internet Protocol (IP) address and multiple ports.

10. The network infrastructure of claim 1, wherein the Security Gateway comprises a multiple-homed, single port Security Gateway configured with multiple virtual Internet Protocol (IP) addresses and one port.

11. The network infrastructure of claim 1, wherein the Security Gateway comprises a multiple-homed, multiple port Security Gateway configured with multiple virtual Internet Protocol (IP) addresses and multiple ports.

12. The network infrastructure of claim 1, wherein the application client is resident on a mobile station.

13. A method of providing access to a protected network with enhanced security, the method comprising:
- (a) in response to a request for an Internet Protocol (IP) address of an application server residing within the protected network from an application client residing outside the protected network, providing as a response from a Domain Name System (DNS) server a DNS response with an IP address of a Security Gateway, wherein the Security Gateway is configured to provide an interface between the protected network and the application client;
- (b) establishing a secure connection between the protected network and the application client via a predetermined secure protocol, responsive to the DNS response;
- (c) providing access for the application client to the Security Gateway via the established secure connection for a limited time for authentication of the application client, while restricting access to the protected network;

(d) receiving at the Security Gateway a username and a password from the application client, the username and the password associated with the application client;

(e) providing the username and password from the Security Gateway to a single sign on (SSO) server in the protected network for an authentication check of the application client;

(f) using the SSO server, performing an authentication check on the username and password, based on a list of valid usernames and passwords for the application server in the protected network;

(g) providing access between the application client and the application server via the established secure connection, in response to the authentication check verifying that the username and password associated with the application client are valid; and (h) requiring, from the application client, further instances of the username and password for continued traffic flow between the application client and the application server.

14. The method of claim 13, wherein the establishing the secure connection includes setting up a secure socket layer (SSL) connection to the Security Gateway.

15. The method of claim 13, wherein the establishing the secure connection includes setting up a virtual private network (VPN) connection to the Security Gateway.

16. The method of claim 13, wherein the Security Gateway is further configured in (c) to implement a timer for establishing a desired time within which to receive the username and the password from the application client.

17. The method of claim 16, wherein the Security Gateway is further configured to terminate access of the application client access to the Security Gateway when the application client fails to provide the username and the password to the Security Gateway within the desired time.

18. The method of claim 13, wherein the Security Gateway is further configured in (g) to terminate access of the application client to the Security Gateway when the authentication check indicates an invalid username and password.

19. The method of claim 13, wherein the Security Gateway is further configured in (c) to provide access for the application client to the Security Gateway for authentication of the application client in response to receiving a pre-shared key from the application client.

20. The method of claim 13, wherein the application client is resident on a mobile station.

* * * * *